3,114,645
METHOD OF MAKING A READILY DISPERSIBLE EGG YOLK POWDER AND PRODUCT
Robert M. Blanken and Richard T. Carey, Syracuse, and Donald E. Mook, Dewitt, N.Y., assignors to The Borden Company, New York, N.Y., a corporation of New Jersey
No Drawing. Filed May 19, 1961, Ser. No. 111,135
6 Claims. (Cl. 99—210)

This invention relates to a readily reconstitutable dehydrated egg powder and to the process of making it, and has particular reference to a readily reconstitutable storage stable dehydrated egg yolk powder.

It is well known that certain Salmonellae are pathogenic for man and present a serious health problem when present in any food. Such pathogenic Salmonellae have been isolated from dehydrated egg yolk powders, even those pasteurized prior to dehydration, making them unsatisfactory for many human uses.

Heretofore, in the preparation of dehydrated egg yolk powders Salmonellae have not been destroyed since the temperature of pasteurization has not exceeded a temperature of about 145° F. Some Salmonellae are able to survive this temperature as well as the temperature used during drying. Attempts to use higher temperatures to destroy the Salmonellae have not been successful since increased temperatures coagulate the egg yolk, decrease the quality of the egg, and lower the solubility and wettability of the product in a reconstituting liquid, such as milk or water.

It has now been found that Salmonella-free dehydrated egg yolk powders can be prepared which reconstitute rapidly, are readily soluble in the reconstituting liquids, and manifest no decrease of quality.

Briefly stated, the present invention comprises a process of making a dehydrated egg yolk wherein egg yolk is diluted with an edible liquid, preheated to a temperature not exceeding 155° F., flash pasteurized by heating to a temperature of at least 160° F. for a time sufficient to destroy any Salmonellae present, rapidly cooled to a temperature below that at which the egg yolk will coagulate, and then dried to form a dehydrated product having a moisture content of about 3% or less.

The invention also comprises the resultant Salmonella-free dehydrated egg yolk powders which are substantially non-coagulated, readily soluble in edible reconstituting liquids, and have excellent quality, and dehydrated whole egg powders made by combining the dehydrated egg yolk of the present invention with egg white treated for Salmonellae.

As to materials, the egg yolks used can be either the yolks from freshly broken eggs which have been separated from the egg whites or commercially available frozen egg yolks.

The edible liquid used to dilute the yolks can be either water, milk, skim milk, condensed skim milk or other non-fat milk products. The dilution liquid is used in an amount sufficient to lower the egg solids (normally about 44% in frozen or fresh egg yolks) to 20%–35%, and preferably 30% for freshly broken-out egg yolks and 22% for frozen egg yolks. Suitable proportions of diluting liquid used to obtain such result are 25–100 parts by weight for every 100 parts by weight of egg yolk, the precise amount depending upon the solids content and type of the particular egg yolks used. Where the dehydrated egg yolk is to be used for the preparation of omelet or scrambled egg powders it is preferred to use 50–70 parts, preferably 65, of skim milk as the diluting liquid. This eliminates the necessity for adding any additonal milk solids when reconstituting for use and only the amount of water necessary for rehydration need be added.

The conditions of preparing the dehydrated egg yolk powder are important. The egg yolk and diluting liquid, such as water, are thoroughly comminuted and admixed to form an emulsified mixture. It is preferred to mechanically emulsify the mixture as by passing through screens up to 50 mesh. It is also possible to homogenize the mixture to thoroughly accomplish this emulsification; such homogenization being carried out at about 100–500 p.s.i.g.

The emulsified egg yolk mixture is then warmed to a temperature of 140° F.–155° F., preferably 150° F., maintained at that temperature for about 1 to 5 minutes, and then immediately subjected to a high temperature-short time heat treatment to destroy the Salmonellae, including any pathogenic Salmonella. This temperature of pasteurization ranges from approximately 160° F. for about 3 minutes to approximately 190° F., for about 10 seconds.

The pasteurized egg yolk mixture is then immediately cooled to below 120° F., conveniently between about 100° to about 120° F. and preferably between 105°–110° F. The immediate cooling is important in order to prevent subsequent coagulation of the egg yolk due to prolonged exposure to the high temperatures of pasteurization.

This temperature reduction is preferably accomplished in a vacuum in order to also strip off undesirable volatile flavors present in the egg yolk. A standard dairy vacuum pan can be used for this purpose.

After the egg yolk mixture has been pasteurized and cooled, it is preferably spray dried, to reduce the moisture content to 3% or less, usually 2–2½%.

In order to aid the dispersibility of the dried egg yolk powder upon rehydration, the mixture may be homogenized subsequent to pasteurization and prior to spray drying. This second homogenization is desirable in that it prevents "bleeding" in the finished egg yolk product. "Bleeding" is the migration of fats or oils to the surface of the egg yolk powder particles and, though undesirable, is considered normal in egg yolk powders prepared by prior procedures.

The dried egg yolk powder is, by preference, gas packed (as in nitrogen) in order to prevent subsequent deterioration of the fat therein upon storage. The resultant product is readily soluble and wettable in the reconstituting liquid.

Reconstituting liquids are water, milk, skim milk, mixtures thereof, and other like edible liquids commonly used to rehydrate dried eggs. The egg yolk powder is rehydrated by adding about 1 ml. of reconstituting liquid for every gram of egg yolk powder.

While dehydrated egg yolk powders have been made in the past which do have a measure of dispersibility and solubility in a reconstituting fluid, they are not free from Salmonella nor are they readily wettable. Long painstaking mixing is required to wet the egg yolk powders to get them into solution and even then some lumps remain which will not dissolve, resulting in an unpalatable product. Attempts to make them Salmonella-free by a more rigorous pasteurization (temperatures above 150° F.) have not been successful since the egg yolks coagulate to form products that have less wettability and storage stability.

The dehydrated egg yolk products of the present invention, however, are both Salmonella-free and also readily dispersible and readily wettable in rehydrating liquids.

The egg yolk powders of the present invention immediately become wet and with a minimum of mixing all lumps are dispersed and placed into solution. The egg powders of the present invention were compared with conventional egg powders for wettability by testing them as described below.

Ten grams of each of the egg yolk powders to be tested were placed into square-sided dilution bottles (Blake bottles having a 150 ml. capacity) containing 100 ml. distilled water. The bottles were shaken for one minute at full speed on a Burrell wrist action shaker and the contents then filtered through previously weighed No. 48 mesh screens. The dilution bottles were then rinsed twice with 50 ml. of distilled water, which wash waters were filtered through the screens. The screens were dried and weighed and the amount of egg yolk solids remaining on the screens calculated as grams per 100 grams of sample and converted to percent wettable.

Wettability

Product of the present process:

(a) _____ 0.14 gram (99.86% wettable).
(b) _____ 0.29 gram (99.71% wettable).

Commercially available dehydrated egg yolk (a) _____ 1.27 grams (98.73% wettable).
(b) _____ 5.84 grams (94.16% wettable).

Although the precise theory is not understood, it is believed that the dilution of the egg yolk with edible liquid prior to pasteurization conditions the mixture to withstand the high temperatures necessary to destroy the pathogenic Salmonella without coagulating the egg yolk and without adversely affecting the storage stability, quality, and wettability of the resultant dehydrated egg yolk powder.

The egg yolk powders of the present invention can be used as such, or can be admixed with Salmonella-free egg albumen prepared as described by Aryes et al. in Food Technology, vol. 3, No. 6, pages 180–183, 1949, in order to have a whole egg substitute. In making such a Salmonella-free dehydrated whole egg approximately 70% of the dehydrated egg yolk prepared as described herein is admixed with 30% Salmonella-free egg albumen. This Salmonella-free whole egg powder can be rehydrated by adding about 3 milliliters of water for every gram of the whole egg powders and used in making custards, meringues, cakes, omelets, scrambled egg and the many other uses to which such eggs are put, as a substitute for fresh whole eggs.

As previously noted, dehydrated omelet and scrambled egg powders can be prepared preferably by using a non-fat milk product, such as skim milk, as the diluting liquid during the processing of the egg yolk. Such egg powders contain, preferably, about 80 parts by weight of egg solids and 20 parts by weight milk solids.

The most desirable method of high temperature-short time pasteurization of the diluted egg yolk mixture is in a steam injector wherein steam under pressure is placed into and admixed with the mixture as it moves through a holding tube and into the vacuum pan. In this manner the temperature of the egg yolk is raised immediately to, and held at, the temperature at which the Salmonellae are destroyed. Upon completion of the pasteurizing, the temperature is lowered immediately in order to prevent prolonged exposure to heat with resultant coagulation of the egg. It is essential to have the warming, high temperature-short time heating, and the rapid lowering of the temperature in order to get a soluble and rapidly dispersible non-coagulated egg yolk powder of good quality which is Salmonella-free.

The invention will be further illustrated by description in connection with the following specific examples or the practice of it and in these examples and elsewhere herein proportions are expressed as parts by weight unless specifically stated to the contrary.

*Example 1*

50 parts of frozen egg yolks were thawed and mixed with 50 parts of water to give 100 parts of material of 22% egg yolk solids. This mixture was screened through a No. 20 mesh screen to break any large lumps of egg yolk and a culture *Salmonella senftenberg* 775 W, a high-heat resistant Salmonella, was added to give a count of about 100,000 Salmonellae per gram of diluted egg yolk.

The mixture was then pumped through a heat exchange system (a conventional dairy plate pasteurizer) and heated to 145° F.; all under 6 pounds' pressure. The heated mixture was then passed into a holding tube into which steam was introduced under 10 pounds of pressure. The mixture temperature was raised to 160° F. and the line pressure dropped to 3 pounds. The mixture was held at 160° F. for about 3 minutes and then subjected to 27 inches of vacuum which caused the temperature to instantly drop to 108° F. A standard dairy vacuum pan was used to cool the egg yolk mixture and a restricted opening in the holding tube adjacent to the vacuum pan provided for proper holding time and line pressure.

Bacteria counts on the material from the vacuum pan showed no Salmonella and egg yolk solids were unchanged at 22%. The product from the vacuum pan was spray-dried to about 2% moisture. The wettability of the dehydrated egg yolk was 99.5% and bacteria counts showed no Salmonella. No undissolved particles remained after the powder was rehydrated.

*Example 2*

A 22% egg yolk solids mixture was prepared as in Example 1 and treated in the same manner, with the exception that the egg yolk-water mixture was homogenized at a pressure of 100 p.s.i.g. instead of being passed through a No. 20 mesh screen.

The resultant dried egg yolk powder (2% moisture) had a wettability index of 99.5% and bacterial counts showed no Salmonella.

*Example 3*

90 parts of frozen egg yolks and 90 parts of water were mixed to give 180 parts of a mixture containing 22% egg yolk solids. This mixture was passed through a No. 20 mesh screen. A culture of *Salmonella senftenberg* 775 W was added to the mixture to give 200,000 organisms per gram of diluted egg yolk.

This mixture was heated to 155° F. and then the temperature was raised to 181° F. and held for about 30 seconds. Steam at 12 p.s.i.g. was used to raise the temperature. The egg yolk mixture was then passed into a vacuum pan where the temperature was instantly reduced to 108° F.

Bacterial counts of the egg yolk mixture from the vacuum pan showed no Salmonella. The mixture from the pan was then spray-dried to 1.8% moisture. The dehydrated egg yolk mixture had a wettability index of 99.7% and bacterial counts showed no Salmonella.

*Example 4*

107 pounds of fresh, broken-out egg yolk (45.6% solids) was mixed with 70 pounds of fresh skim milk to give 177 pounds of 30.8% egg yolk-milk solids material. The mixture was screened and *S. senftenberg* 775 W was added to give 100,000 organisms per gram of material.

The mixture was then pasteurized and dried to 2% moisture as set forth in Example 3. The resultant dehydrated egg yolk powder containing milk solids had a wettability index of 99.6% and bacterial counts showed no Salmonella.

*Example 5*

100 parts of a Salmonella-free whole egg powder was prepared by admixing 70 parts of the Salmonella-free egg yolk powder with 30 parts of the spray-dried egg albumin treated for Salmonella by the Ayres method (noted above).

Approximately 14 parts of the above whole egg powder is equivalent to one whole fresh shell egg, when reconstituted.

(a) Standard yellow cakes, each requiring one whole fresh shell egg, were made using commercially available yellow cake mixes and fresh shell eggs. Such cakes ranged in volume from 975–991 ml.

The same yellow cake mixes were used and baked in the same manner as above with the exception that 14 parts of the dried, mixed whole egg of the present invention was substituted for a whole fresh shell egg used above. Also 43 ml. of either water or milk were added in addition to the other liquids required for the mix in order to provide the liquid necessary for rehydration of the dried whole egg. Cakes made with the dried, mixed whole egg solids ranged in volume from 1050–1120 ml.

(b) Omelets and scrambled eggs were made by rehydrating the whole, mixed, dried egg with water, the requisite amount of milk, or mixtures of both. The rehydrated eggs were then fried in a hot skillet. In every instance omelets and scrambled eggs were obtained which in appearance and taste were indistinguishable from omelets and scrambled eggs made from whole fresh eggs.

*Example 6*

106 parts of the Salmonella-free egg yolk-skim milk powder of Example 4 were admixed with 41 parts of the spray-dried egg albumin treated for Salmonella by the Ayres method (noted above). Scrambled eggs were prepared by rehydrating 45 parts of the mixed, whole egg-skim milk powder with 139 parts of water, and frying in a hot skillet. In every instance no undissolved lumps were found in either the rehydrated mixture or the scrambled eggs, the latter being indistinguishable in appearance and flavor from scrambled eggs made from fresh whole eggs.

In the foregoing examples the bacterial counts were made by adding a measured quantity of the treated egg yolk to selenite F broth and, after the proper length of holding time, streaking a sample of the broth onto bismuth sulfite agar and Brilliant Green agar, both of which are selective for Salmonella.

It will be understood that it is intended to cover all changes and modifications of the examples of the invention herein chosen for the purpose of illustration which do not constitute departures from the spirit and scope of the invention.

We claim:

1. The method of making a readily dispersible egg yolk powder comprising the steps of mixing egg yolk with at least 25 parts by weight, based on 100 parts by weight of the egg yolk, of an edible diluting liquid selected from the group consisting of water, milk, and non-fat containing liquid milk products, warming the mixture to a temperature of about 140° F. to about 155° F., maintaining the mixture at that temperature for about 1 to about 5 minutes, subjecting the mixture to a heat treatment within the range of approximately 160° F. for a period of about 3 minutes to approximately 190° F. for a period of about 10 seconds, cooling the mixture to a temperature below about 120° F., and drying said mixture to reduce the moisture content to at least about 3%, said heat treatment being sufficient to destroy any Salmonella present in said mixture.

2. The method of making a readily dispersible egg yolk powder comprising the steps of mixing egg yolk with at least 25 parts by weight, based on 100 parts by weight of egg yolk, of an edible diluting liquid selected from the group consisting of water, milk, and non-fat containing liquid milk products, warming the mixture to a temperature of about 150° F., maintaining the mixture at that temperature for about 1 to about 5 minutes subjecting the mixture to a heat treatment within the range of approximately 160° F. for a period of about 3 minutes to approximately 190° F. for a period of about 10 seconds, cooling the mixture to a temperature of from 100° F. to about 120° F., and spray drying said mixture to reduce the moisture content of about 3%.

3. The method as set forth in claim 1, wherein the egg yolk diluting liquid mixture is subjected to mechanical emulsification prior to warming.

4. The method as set forth in claim 2, wherein the heat treated egg yolk diluting liquid emulsion is homogenized prior to drying.

5. The method as set forth in claim 3, wherein the edible liquid is water.

6. As a new product, egg yolk powder prepared in accordance with the process of claim 1.

References Cited in the file of this patent

UNITED STATES PATENTS

| | | |
|---|---|---|
| 2,476,412 | Harris | July 19, 1949 |
| 2,479,310 | Chapin | Aug. 16, 1949 |
| 2,876,108 | Taylor et al. | Mar. 3, 1959 |
| 2,989,405 | Stokes et al. | June 20, 1961 |